United States Patent [19]

Wasserman

[11] E Re. 29,840

[45] Reissued Nov. 21, 1978

[54] BICYCLE RACK

[76] Inventor: Steven A. Wasserman, 4920 Chase, Skokie, Ill. 60076

[21] Appl. No.: 780,317

[22] Filed: Mar. 23, 1977

Related U.S. Patent Documents

Reissue of:

[64] Patent No.: 3,874,575
Issued: Apr. 1, 1975
Appl. No.: 305,349
Filed: Nov. 10, 1972

[51] Int. Cl.[2] ..... B60R 9/00

[52] U.S. Cl. ..... 224/42.03 B; 224/42.07

[58] Field of Search ..... 224/42.03 B, 42.07, 224/42.42, 42.43, 42.1 R, 42.45, 42.44, 29 R, 42.1 E, 42.1 F; 211/17, 22, 18

[56] References Cited

U.S. PATENT DOCUMENTS

| | | | |
|---|---|---|---|
| 1,437,477 | 12/1922 | Stacy | 224/42.43 |
| 3,260,429 | 7/1966 | Yuda et al. | 224/42.1 R |
| 3,265,262 | 8/1966 | Motsinger | 224/42.1 R |
| 3,338,485 | 8/1967 | Leer, Jr. et al. | 224/42.45 R |
| 3,464,608 | 9/1969 | Rodriguez | 224/42.03 B |
| 3,710,999 | 1/1973 | Allen | 224/42.03 B |

FOREIGN PATENT DOCUMENTS

| | | | |
|---|---|---|---|
| 123,961 | 2/1949 | Sweden | 224/42.03 B |
| 625,461 | 6/1949 | United Kingdom | 224/42.03 B |

*Primary Examiner*—Trygve M. Blix
*Assistant Examiner*—Kenneth Noland
*Attorney, Agent, or Firm*—Mason, Kolehmainen, Rathburn & Wyss

[57] ABSTRACT

A rack for securing bicycles to the trunk lid of an automobile. The rack includes a rigid support member having legs which rest directly on top of the trunk lid. A pair of rearwardly extending arms are rigidly mounted on the rear portion of the rigid support and are adapted to receive the frame of a bicycle thereon. Straps extend from the rigid support and are secured to the lower edge of the back of the trunk lid in order to hold the support member rigidly against the top of the trunk lid. Means are provided to interconnect the front of the support to the front of the trunk lid. A cable or chain passes around and is secured to the bicycle and interconnects to the means which interconnects the front portion of the bicycle rack to the front of the trunk lid.

9 Claims, 8 Drawing Figures

FIG. 4.
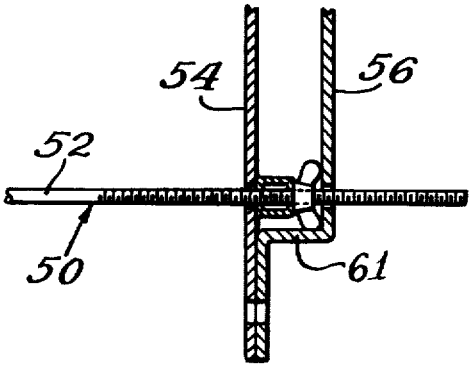
FIG. 5.
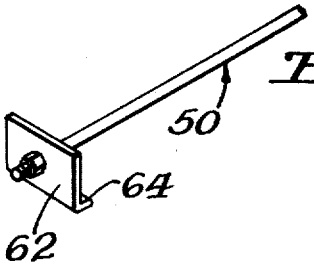
FIG. 6.
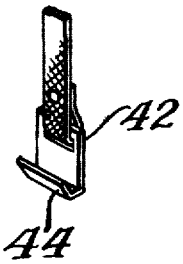
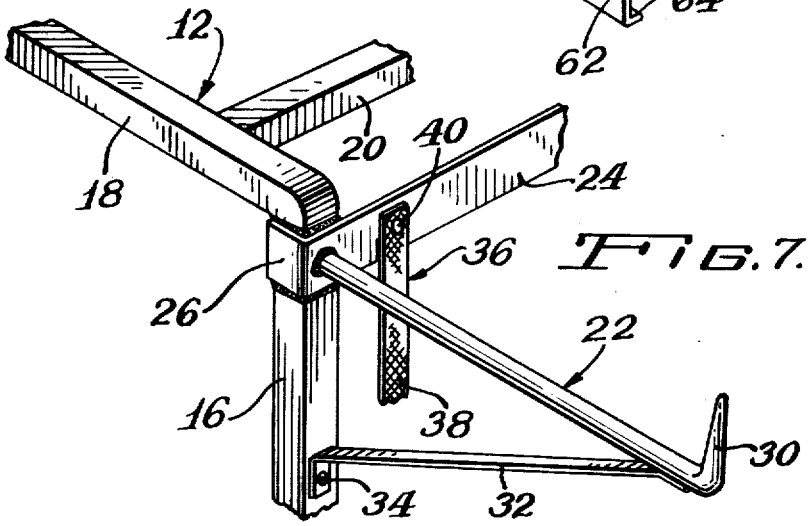
FIG. 7.
FIG. 8.
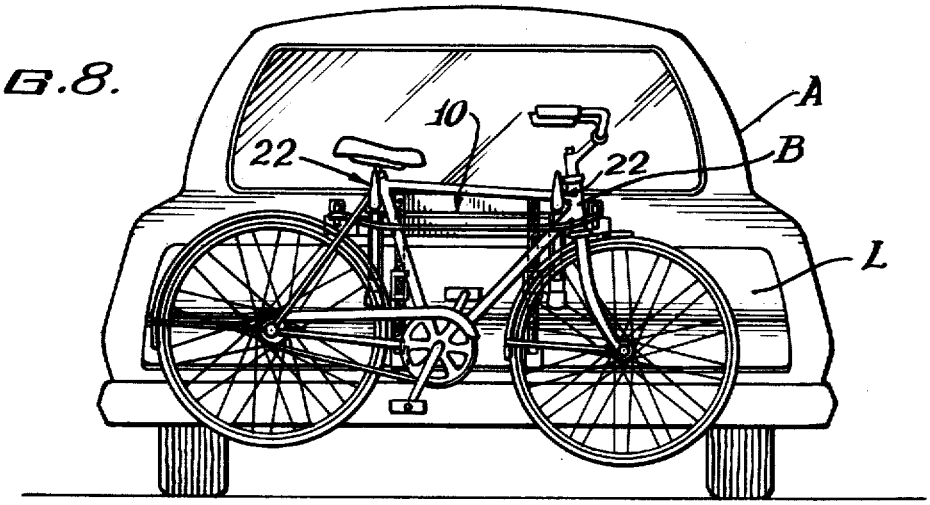

BICYCLE RACK

Matter enclosed in heavy brackets [ ] appears in the original patent but forms no part of this reissue specification; matter printed in italics indicates the additions made by reissue.

BACKGROUND OF THE INVENTION FIELD OF THE INVENTION AND DESCRIPTION OF THE PRIOR ART

This invention relates to bicycle racks or carriers for mounting on automobiles, and it particularly relates to bicycle racks or carriers for automobiles, wherein the rack, as well as the bicycle, is secured to the lid in such a way as to discourage theft.

In the last few years, there has been a great increase in the use of bicycles, particularly by adults, for leisure, as well as for practical purposes, as for use by commuters between train stations and their homes. Not only has the use of bicycles increased greatly, but more and more city parks and outlying recreational areas have set aside bicycle trails which are not open to motor vehicle transportation. In addition to these bicycle trails, which are specifically set aside for such purposes, bicycle riders often enjoy bringing their bicycles into rural areas for bicycling on a country road. Because such bicycle trails and country roads, more often than not, are at substantial distances from the bicycle rider's home, it is necessary to transport bicycles by automobile to the place where the bicycle is to be ridden. Generally speaking, it is very inconvenient or impossible to place a bicycle inside the passenger space of an automobile or inside the automobile's trunk. Many times trunks are not simply large enough to receive the bicycle and, even if the bicycle can be placed in the car, there is no room in the car for more than one or two passengers. Therefore, anyone who wishes to transport bicycles for use at substantial distances from his home needs a bicycle rack or carrier for mounting the bicycle rigidly on the exterior of the automobile.

Known bicycle racks or carriers are of various types. Some of the known types of bicycle racks mount directly to the rear bumper of the automobile and the bicycle rests on the arms which extend rearwardly therefrom. A flexible strap on the leg holds the bicycle in place so as to prevent it from being jarred off. Another type of rear bumper bicycle rack is a "well" type, wherein the wheels of the bicycle are inserted in openings or wells. In still another type of bicycle carrier, the rack is secured to the roof of the car and the bicycle is received in an upside-down position on the rack. Other types of auto mounted bicycle carriers use straps and support members for holding the bicycle to the trunk lid of an automobile, the bike being laid down horizontally on the trunk lid.

Such prior art bicycle racks are generally satisfactory for their intended purposes, but all are considered to have certain disadvantages. For example, bumper mounted bicycle carriers make it difficult to obtain access to the trunk of the car. Other types, such as the trunk lid mounted type bicycle carriers, may also make it difficult to gain access to the trunk because the bike is mounted directly on top of the lid and it is difficult to raise the trunk lid sufficiently high. Still further, roof mounted bicycle carriers are considered difficult to mount on the roof and the securing of the bicycle on the rack, once mounted, is difficult. Also, no known bicycle racks use any type of locks to discourage theft. With the increase in the bicycle riding, there has also been a significant and unfortunate increase in bicycle thefts. Thus, although known bicycle racks have generally proven satisfactory, that is, for transporting bicycles, it has been a rather simple matter not only to steal the bicycle from the bicycle rack, but also to steal the bicycle, together with the rack.

SUMMARY OF THE INVENTION

It is therefore an important object of this invention to provide an improved bicycle carrier for mounting on automobiles, wherein the disadvantages of similar prior art devices are substantially avoided.

It is also an object of this invention to provide an improved carrier for mounting bicycles on automobiles wherein the bicycle rack and bicycle can be locked to a trunk lid to thereby discourage theft of the bicycle and/or carrier.

It is yet another object of this invention to provide an improved carrier for mounting bicycles on automobiles wherein the carrier is particularly characterized by its simplicity and economy of construction, manufacture, and use.

It is a further object of this invention to provide an improved carrier for mounting bicycles on automobiles wherein the bicycle is suspended from the trunk lid of the automobile but the bicycles themselves extend beyond the rear end of the automobile to thereby provide convenient access to the trunk.

It is still another object of this invention to provide an improved rack for mounting bicycles to automobiles wherein the rack may be easily mounted to a trunk lid of an automobile and wherein the bicycle and rack are locked in place thereon to discourage theft.

Further purposes and objects of this invention will appear as the specification proceeds.

The foregoing objects are accomplished by providing a carrier for mounting bicycles on the trunk lid of an automobile wherein the carrier includes a rigid support having a front portion and a rear portion, the support member resting directly on the trunk lid, means mounted on the rear portion of the support member and projecting rearwardly therefrom for receiving at least one bicycle thereon, means for connecting the rear portion of the support member to the rear of the trunk lid, means for interconnecting the front portion of the support member to the front of the lid, flexible elongated means for connection to the bicycle, and means for interlocking the flexible means to the front portion interconnecting means to thereby lock the bicycle and the rack to the trunk lid to discourage theft.

BRIEF DESCRIPTION OF THE DRAWINGS

One particular embodiment of the present invention is illustrated in the accompanying drawings wherein:

FIG. 4 is a detailed, enlarged sectional view of a portion of the means used to interconnect the support member to the means for interconnecting the support member to the trunk lid;

FIG. 5 is a pictorial view of the bracket used to interlock the front of the support member to the front of a trunk lid;

FIG. 6 is a pictorial view of the bracket used to interlock the rear of the support member of the bicycle rack to the rear of the trunk lid;

FIG. 7 is a pictorial view of a rear corner of the support member with one bicycle supporting arm shown thereon; and FIG. 8 is a rear view of an automobile using my improved bicycle rack with a bicycle shown in place on the rack.

DETAILED DESCRIPTION OF THE PREFERRED EMBODIMENT

Figure 1:
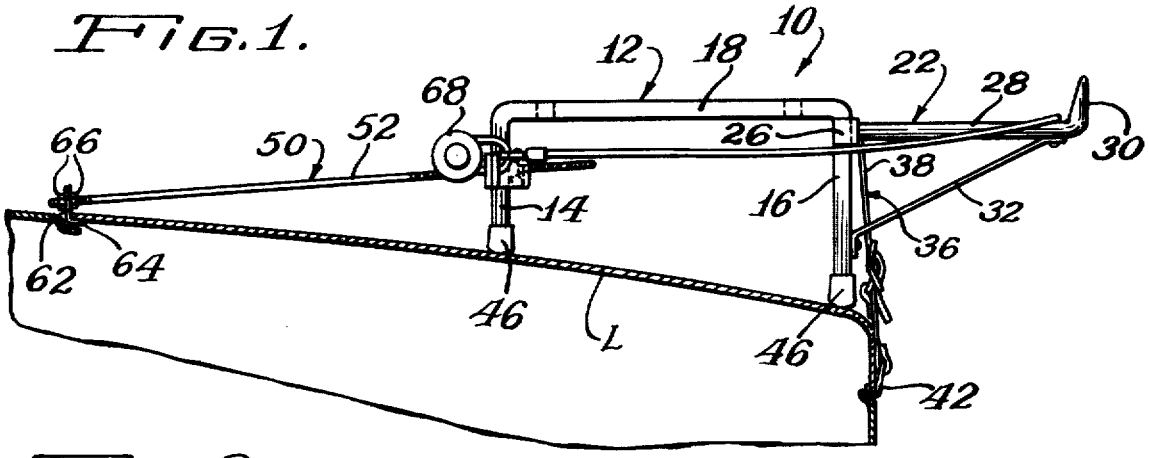
FIG. 1 is a side elevational view of my improved bicycle carrier for automobiles, shown mounted on the trunk lid of an automobile.
Figure 2:
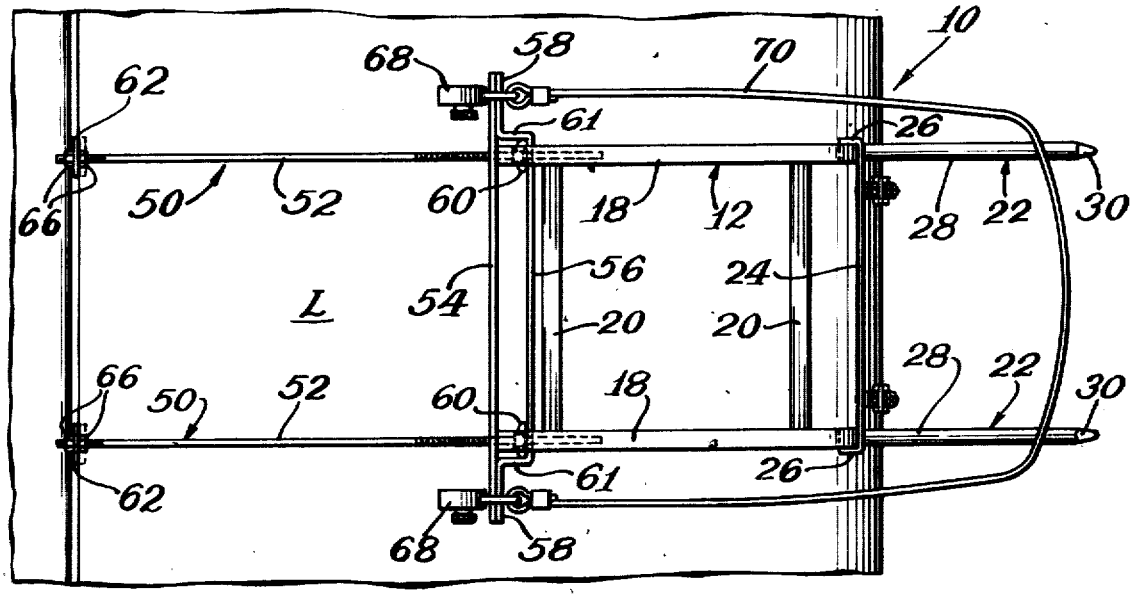
FIG. 2 is a top plan view of the embodiment shown in FIG. 1.
Figure 3:
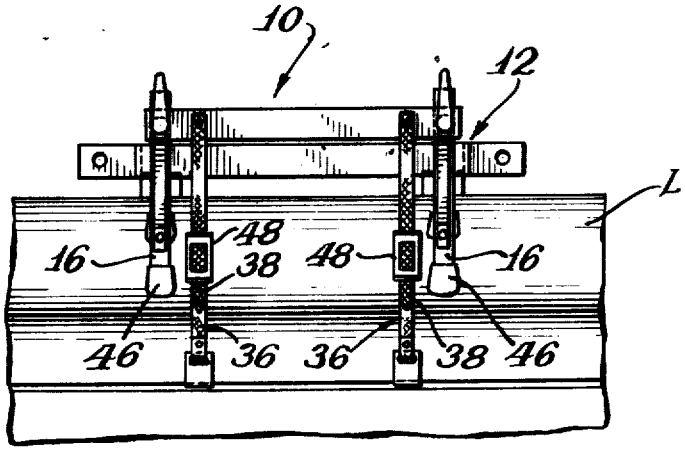
FIG. 3 is a rear view of the embodiment shown in FIGS. 1 and 2.

Referring to the drawings, and particularly to FIGS. 1–3, my improved bicycle rack carrier, generally 10, is shown in a securely mounted position on the lid L of a trunk of an automobile A.

The carrier 10 includes a main, rigid support member, generally 12, which includes a pair of laterally spaced upright front legs 14 and a pair of laterally spaced upright rear legs 16. Each pair of legs 14 and 16 are unitarily interconnected by a longitudinal horizontal member 18. A horizontal member 18, a front leg 14, and a rear leg 16 define an inverted U-shaped side member. The front legs 14 of the support member 12, in the embodiment shown, are shown somewhat shorter than the rear legs 16 so as to compensate for the downward and rearward slant of the top of the specific trunk lid L shown. A pair of horizontal transverse cross members 20 are rigidly interconnected to the inverted U-shaped side members defined by the front legs, horizontal members 18 and rear legs 16. The inverted U-shaped sidemembers and the cross member 20 are all desireably constructed of a square, hollow cross section steel or aluminum member. The cross members 20 are secured, as by welding, to the horizontal members 18 at the point of interconnection therebetween.

Referring to FIG. 7, as well as to FIGS. 1 and 2, a pair of rigid rearwardly extending bicycle support arms, generally 22, are rigidly interconnected to the rear legs 16 of the support frame 12. The support arms 22 include a cross plate 24 which extends transversely between the upper and rear surfaces of the rear legs 16 and are secured thereto, as by welding, to the rear upper face of the rear legs 16. Desirably, the cross plate 24, includes frontwardly extending flanges 26, which are welded to the side faces of the rear legs 16 in order to provide for an even more rigid interconnection therebetween.

A rearwardly extending rigid arm 28 is secured, as by welding, to the outer end portion of each end portion of the cross plate 24. The support arm 28 includes an upstanding outer leg 30. Preferably, in order to properly support the outer end of the support arm 28, an angle brace 32 is connected at one end to the lower portion of the rear leg 16 and at the other end to the lower outer end of the bicycle support arm 28. The brace 32 may be secured to the rear leg 16 and to the undersurface of the support arm 28 by any suitable means, as by a rivet 34. As best seen in FIG. 8, the frame of a bicycle B rests on the arms 28 and the legs 30 prevent the bicycle B from sliding back off the arms 28.

Referring particularly to FIGS. 1, 3, 6, 7, and 8, the rear portion of the support member 12 is held tightly against the top surface of the trunk lid L by flexible securing members, generally 36. The securing members comprise a pair of flexible and adjustable straps 38, which have their upper ends fixedly secured, as by bolts or rivets 40, to the cross plate 24, which in turn, is rigidly to the rear leg 16 of the support 12. The lower ends of the flexible straps 38 have brackets 42 secured therein. Each bracket 42 defines an upwardly facing hook portion 44 which engages under the lower edge of the rear of the trunk lid L, as best seen in FIG. 1. When the straps 38 are tightened by buckles 48, the rear of the support member is held firmly against the top of the trunk lid L. As shown, in order to prevent scratching or denting of the trunk lid L, the bottoms of the legs 14 and 16 have bumpers 46 mounted thereon.

The carrier 10 also includes a pair of front, rigid securing members, generally 50, for rigidly securing the front portion of the support member 12 to the front of the trunk lid L. Each securing member 50 also includes a pair of substantially horizontal elongated rods 52 which are threaded at their opposite ends. The rods 52 are transversally spaced from each other and extend longitudinally of the automobile. The rear threaded ends of the rods 52 pass through suitable apertures provided in each of the rear legs 16 of the support member 12, as best seen in FIG. 4. The rods 52 also pass through a front, separate cross plate 54 which has spaced openings as again seen in FIG. 4, through which the threaded rear ends of each of the rods 52 pass. A formed rear cross plate 56 extends across the rear side of the rear leg 16, as best seen in FIGS. 2 and 4. The rear cross plate 56 is formed to pass around the legs 16 and a pair of outwardly extending flanges 58 are provided thereon for positioning adjacent the outer ends of the front cross plate 54. Apertures are also provided in the rear cross plate 56 for securing rear ends of the threaded rods 52. Intermediate the rear leg 16 and the rear cross plate 56, a wing nut 60 is threadably mounted on each threaded rod 52 for securing each threaded rod 52 directly to the support member 12. Preferably, the longitudinal section 61 of the rear cross plate 56, is dimensioned so as to prevent turning of the wing nut 60 after the formed cross plate 56 is secured in place. The front end of the cross rod 52, as best seen in FIGS. 1 and 5, includes a bracket 62 which includes a rearwardly extending hook 64. As best seen in FIG. 1, the hook 64 of the bracket 62 is designed to engage the front edge of the trunk lid L. A pair of lock nuts 66 rigidly secure the bracket 62 to the front end of the threaded rods 52.

As best seen in FIGS. 2 and 4, a pair of locks 68 are secured to the opposite ends of a flexible cable 70. The flexible cable 70, as seen in FIG. 8, is secured to the frame of the bicycle B and the opposite ends are secured to each lock 68. The lock 68 passes through the apertures in the outer ends of the front cross plate 54 and flanges 58 of the rear cross plate 56.

In mounting the carrier 10, the support member 12 is first positioned on top of the trunk lid L. The bicycle support arms 28 should extend outwardly beyond the rear end of the automobile A, so that the bike B hangs downwardly, as shown in FIG. 8, beyond the rear end of the auto. The mounting of the support member 12 on the lid L is accomplished when the lid L is not locked. The brackets 42 in the flexible straps 38 are placed under the lower edge of the rear of the lid L and then the straps are secured tightly by the buckles 48 to hold the rear of the support member 12 tightly against the trunk lid L. The brackets 62 at the front end of the rod 52 are then placed under the front edge of the trunk lid L, and the rear end of the rods are passed first through the rear cross plate 56 and then through the front cross legs 14. The wing nuts 66 are then threaded onto the threaded ends of the rods 52 and are tightly secured thereon until the front end of the support member 12 is rigidly secured in place. The rear cross plate 56 is then placed over the ends of the rods 52 and the flanges 58 are placed adjacent the outer end of the front cross plate 54. The cable 70 is passed around the frame of the bicycle B which has been placed on the support arms 28 therefor. The shackles of the locks 68 are then passed through the apertures in the cross plates 54 and 56 and the lock is secured thereon.

It is seen from the foregoing that I have provided a bicycle carrier for mounting on automobiles which discourages theft of the bicycle. Not only is the bicycle securely mounted and locked in place to the carrier, but the locked carrier would be difficult to manipulate if someone wished to steal the bicycle and/or the carrier. It would be time consuming and would require significant manipulation for this to be accomplished. Also, the carrier is very simple in construction and easy to use. Thus, all of the objects previously set forth have been accomplished.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. A rack for mounting a bicycle on to a portion of an automobile with a front edge and a rear edge while discouraging theft of the bicycle and rack, said rack comprising, in combination, a rigid support member having a front portion and a rear portion, means rigidly mounted on said rear portion of said support member and projecting rearwardly therefrom for supporting at least one bicycle thereon, means for connecting said rear portion of said support member to the rear of said automobile portion, means for interconnecting said front portion of said support member to the front of said automobile portion, said front interconnecting means including a pair of rigid interconnecting rods having means at one end thereof for interconnection to said automobile portion and having means at the other end thereof for interconnection to said support member, a pair of adjustable plate members receiving said rod members and engaging the front of said support members, flexible elongated means engaging said bicycle, and means for interlocking said flexible member to said support member for discouraging theft of said bicycle.

2. The combination of claim 1 wherein said automobile portion is a trunk lid.

3. The combination of claim 1 wherein said bicycle receiving means comprises a pair of rearwardly projecting spaced arms, said arms extending beyond the rear of the automobile, and upstanding legs at the outer ends of said spaced arms.

4. The combination of claim 1 wherein said front portion interconnecting means comprises a pair of rigid connecting rods having means at one end thereof for interconnection to said automobile portion and having means at the other end thereof for interconnection to said support member.

5. The combination of claim 1 wherein said plate members receive lock members at its opposite ends, each of said lock members also being interconnected to the opposite ends of said flexible means to thereby lockably secure said bicycle to said rack.

*6. A rack for mounting two-wheeled vehicles on a portion of an automobile while discouraging theft of the vehicle and rack, a support member comprising a pair of inverted generally U-shaped members each having an intermediate bight portion, a front leg and a rear leg, and rigid cross members interconnecting said inverted U-shaped members, each of said inverted U-shaped members resting on the upper surface of said automobile portion, a pair of vehicle support arms connected to the rear leg of each of said inverted U-shaped members and extending rearwardly beyond said support members in a direction generally parallel to said bight portions of said members, flexible adjustable means for connecting said support member to the rear edge of said automobile portion, rigid means for interconnecting said support member to the front edge of said automobile portion, said rigid means including at least one rigid rod having a forward end secured to the front edge of said automobile portion, the other end of said rod being interconnected with said front leg of one of said inverted U-shaped members and adjustable with respect thereto, thereby to position said support member at a desired location on said automobile portion, means for preventing separation of said adjusted rod from said front leg to prevent removal of said support member from said automobile portion, and locking means including a flexible cable interconnecting a vehicle positioned on said support arms and said support member for preventing removal of the vehicle from said support member.*

*7. The combination of claim 6, which includes a pair of brace members extending at an angle between the bottom portions of said rear legs of said support member and the rear end of said vehicle support arms, thereby to prevent bending of said support arms under the weight of a vehicle placed thereon.*

*8. A rack for mounting two-wheeled vehicles on a portion of an automobile while discouraging theft of the vehicle and rack, a support member comprising a pair of inverted generally U-shaped members each having an intermediate bight portion, a front leg and a rear leg, and rigid cross members interconnecting said inverted U-shaped members, each of said inverted U-shaped members resting on the upper surface of said automobile portion, a pair of vehicle support arms connected to the rear leg of each of said inverted U-shaped members and extending rearwardly beyond said support member in a direction generally parallel to said bight portions of said members, flexible adjustable means for connecting said support member to the rear edge of said automobile portion, rigid means for interconnecting said support member to the front edge of said automobile portion, said rigid means including at least one rigid rod having a forward end secured to the front edge of said automobile portion, the other end of said rod being threaded and extending through said front leg of one of said inverted U-shaped members, a nut on said threaded other end portion for adjusting the position of said rod relative to said front leg, thereby to position said support member at a desired location on said automobile portion, means for preventing rotation of said nut after it has been adjusted, thereby to prevent removal of said support member from said automobile portion, and locking means including a flexible cable interconnecting a vehicle positioned on said support arms and said support member for preventing removal of the vehicle from said support member.*

*9. A rack for mounting two-wheeled vehicles on a portion of an automobile while discouraging theft of the vehicle and rack, a support member comprising a pair of inverted*

*generally U-shaped members each having an intermediate bight portion, a front leg and a rear leg, and rigid cross members interconnecting said inverted U-shaped members, each of said inverted U-shaped members resting on the upper surface of said automobile portion, a pair of vehicle support arms connected to the rear leg of each of said inverted U-shaped members and extending rearwardly beyond said support member in a direction generally parallel to said bight portions of said members, flexible adjustable means for connecting said support member to the rear edge of said automobile portion, rigid means for interconnecting said support member to the front edge of said automobile portion, said rigid means including a pair of*

*rigid rods secured to the front edge of said automobile portion and having threaded end portions which extend through openings in said front leg of each of said inverted U-shaped members, a nut on the threaded end portion of each of said rods for individually securing said rods in adjusted position with respect to said support member, means for preventing rotation of each of said nuts after said rods have been adjusted with respect to said support member, and locking means including a flexible cable interconnecting a vehicle positioned on said support arms and said support member for preventing removal of the vehicle from said support member.*

* * * * *